(12) United States Patent
Platzer (10) Patent No.: US 9,283,472 B2
(45) Date of Patent: Mar. 15, 2016

(54) METHOD AND DEVICE FOR CONTROLLING AND/OR MONITORING RACING VEHICLES ON A RACETRACK

(75) Inventor: Peter Platzer, Linz (AT)

(73) Assignee: AMUSYS AMUSEMENT SYSTEMS ELECTRONICS GMBH, Hoersching (AT)

( * ) Notice: Subject to any disclaimer, the term of this patent is extended or adjusted under 35 U.S.C. 154(b) by 113 days.

(21) Appl. No.: 13/816,398

(22) PCT Filed: Jul. 22, 2011

(86) PCT No.: PCT/EP2011/003695
§ 371 (c)(1),
(2), (4) Date: Feb. 11, 2013

(87) PCT Pub. No.: WO2012/019699
PCT Pub. Date: Feb. 16, 2012

(65) Prior Publication Data
US 2013/0143631 A1 Jun. 6, 2013

(30) Foreign Application Priority Data
Aug. 12, 2010 (EP) .................................. 10008439

(51) Int. Cl.
*A63F 13/00* (2014.01)
*A63H 18/00* (2006.01)
(Continued)

(52) U.S. Cl.
CPC .............. *A63F 13/00* (2013.01); *A63H 18/005* (2013.01); *A63H 18/12* (2013.01); *G07C 1/22* (2013.01)

(58) Field of Classification Search
CPC ..... A63F 13/57; A63F 13/65; A63F 3/00082; A63F 9/14; A63F 2300/69

USPC .................................................. 463/6, 38, 36
See application file for complete search history.

(56) References Cited

U.S. PATENT DOCUMENTS 4,183,056 A  1/1980  Evans et al.
5,140,307 A  8/1992  Rebetez et al.
(Continued)

FOREIGN PATENT DOCUMENTS

CN  2451194  10/2001
DE  3725227  2/1989
(Continued)

OTHER PUBLICATIONS

International Search Report for PCT/EP2011/003695, English translation attached to original, Both completed by the European Patent Office on Sep. 30, 2011, All together 5 Pages.

*Primary Examiner* — James S McClellan
(74) *Attorney, Agent, or Firm* — Brooks Kushman P.C.

(57) ABSTRACT

A method and a device for controlling and/or monitoring a plurality of racing vehicles on a racetrack which are controlled by participants in a race is disclosed. Each racing vehicle provided with one vehicle memory in which vehicle data which are read out from a receiving/reading device assigned to the racetrack are stored in a database. Each participant in the race is provided with separate a participant memory in which participant data is stored, the participant data being read out from a receiving/reading device and stored in the database in which the vehicle data are also stored. The vehicle data and participant data which are stored in the database are assigned to one another. The vehicle data and participant data are read and the assignment of the vehicle data which are read with the participant data which are read is compared with the assignment which was previously assigned.

17 Claims, 5 Drawing Sheets

(51) Int. Cl.
*A63H 18/12* (2006.01)
*G07C 1/22* (2006.01)

(56) References Cited

U.S. PATENT DOCUMENTS

| | | | |
|---|---|---|---|
| 5,461,924 | A | 10/1995 | Calderara et al. |
| 5,666,101 | A | 9/1997 | Cazzani et al. |
| 5,813,351 | A | 9/1998 | Chen |
| 5,970,882 | A | 10/1999 | Smith et al. |
| 6,189,838 | B1 | 2/2001 | Nicolette et al. |
| 6,542,183 | B1 | 4/2003 | DeAngelis et al. |
| 6,545,705 | B1 | 4/2003 | Sigel et al. |
| 7,102,670 | B2 | 9/2006 | Seaman et al. |
| 7,106,360 | B1 | 9/2006 | Frederick |
| 7,285,035 | B1 | 10/2007 | Tullis |
| 7,336,178 | B2 | 2/2008 | Le |
| 7,448,626 | B2 | 11/2008 | Fleckenstein |
| 7,627,451 | B2 | 12/2009 | Vock et al. |
| 8,456,527 | B2 | 6/2013 | Elangovan et al. |
| 2004/0067004 | A1 | 4/2004 | Hill et al. |
| 2006/0087427 | A1* | 4/2006 | Le .................... 340/539.13 |
| 2006/0183405 | A1 | 8/2006 | Mathews |

FOREIGN PATENT DOCUMENTS

| | | |
|---|---|---|
| DE | 10336447 | 3/2005 |
| EP | 0949483 | 10/1999 |
| EP | 1967241 | 9/2008 |
| GB | 2382488 | 5/2003 |
| WO | 9953686 | 10/1999 |
| WO | 2006042235 | 4/2006 |

* cited by examiner

FIG. 1

| Lane | Driver | Vehicle |
|---|---|---|
| 1 | Amilcar | 5 |
| 2 | Thomas | 3 |
| 3 | Alois | 1 |
| 4 | Alex | 2 |
| 5 | Christina | 6 |
| 6 | Helena | 4 |
| | | |
| | | |

METHOD AND DEVICE FOR CONTROLLING AND/OR MONITORING RACING VEHICLES ON A RACETRACK

CROSS-REFERENCE TO RELATED APPLICATION

This application is the U.S. national phase of PCT Appln. No. PCT/EP2011/003695 filed on Jul. 22, 2011, which claims priority to European Patent Application No. EP 10008439.1 filed on Aug. 12, 2010, the disclosures of which are incorporated in their entirety by reference herein.

The present invention relates to a method and a device for controlling and/or monitoring a plurality of racing vehicles controlled by racing participants on a racetrack, wherein each racing vehicle is respectively provided with a vehicle memory, in which vehicle data are stored, which vehicle data are read out by a receiver/reader and are stored in a database.

Racing operation on racetracks is usually monitored with the aid of technical detection means and controlled with corresponding control components, which concerns, for example, the detection of the number of laps travelled and/or lap time or the identification of a respective vehicle or of a driver assigned to said vehicle. Besides the monitoring measures that have already been known per se for a relatively long time, such as light barriers for detecting speed, camera monitoring for detecting the finish or the like, recently it has also already been proposed to monitor and/or control vehicles and the drivers controlling them and also the vehicle position on the racetrack and the travelled time or distance by electronic data transmission from the vehicle. By way of example, the documents WO 2006/042235 A2 and US 2006/0183405 A1 propose fitting so-called RFID elements, i.e. identifier components that operate with radio data communication, to the racing vehicles and storing in said RFID elements a vehicle identifier, a driver identifier and, if appropriate, further vehicle and driver data and racing operation data, which are then read out by suitable RFID readers situated at the racetrack, for example in such a way that each time the finishing line is crossed, the RFID element of a vehicle is read, the lap counter is correspondingly increased and this is stored together with the vehicle and driver identifiers.

In this case, control and monitoring devices of this type are used in particular for model racetracks, in particular so-called slot car tracks, and can also be used, in principle, on real racetracks and the racing vehicles that drive thereon. Suitable racing vehicles here include naturally different types of vehicles such as cars or motorcycles, for example, but in principle other racing objects such as, for example, horses, sulkies or watercraft such as powerboats can also be equipped with corresponding devices, such that the term racing vehicle in the context of the present application should be understood broadly.

Such racing operation with racing vehicles is naturally subject to manipulation, whether by the participants themselves, who absolutely want to win even with the aid of unfair means, or by third parties, who want to increase their chances of winning for example for placing bets. In this case, the use of the abovementioned technical detection means does not necessarily increase security, since even such monitoring means that are incorruptible per se can be manipulated. By way of example, the abovementioned vehicle memories, in which the vehicle identifiers are stored, can be manipulated for example to the effect that they transmit the corresponding signals inherently too early and/or to an excessive extent, such that crossing the finishing line is detected too early. Conversely, the transmission of the data stored in the memory components can be delayed, such that an early start is concealed.

Furthermore, a possibility for manipulation also arises to the effect that data stored in the vehicle memories are manipulated, for example to the effect that a driver who is not driving at all is stored as racing participant in order to improve said driver's lap account or points account, or to the effect that racing parameters such as number of laps stored in the vehicle memory are manipulated during racing.

Furthermore, it can happen that drivers register a rule-conforming racing vehicle for themselves, but then for racing take a different vehicle which, by way of example, has been registered for a team colleague or has not been registered at all and promises better chances of success.

Against this background, the present invention is based on the object of providing an improved method and an improved device of the type mentioned in the introduction which avoid the disadvantages of the prior art and develop the latter in an advantageous manner. In particular, manipulations of racing operation and fraud are intended to be made more difficult and the security of control, monitoring and evaluation of racing operation is intended to be improved.

According to the invention, this object is achieved by means of a method according to claim 1 and a device according to claim 16. The dependent claims relate to preferred configurations of the invention.

It is therefore proposed that the data used for the control and/or monitoring of racing operation are divided among a plurality of locations and stored selectively in different data memories, such that only a central control and/or monitoring computer, which, if appropriate, can consist of a plurality of separate computer units, has access to all the required data. In particular, the vehicle- and driver-specific data are also split in order to be able to monitor and centrally control the assignment of driver and vehicle. According to the invention, each racing participant is provided with a participant memory, which is separate from the vehicle memory and in which participant data, in particular identification data such as a driver identifier are stored, which are read out by a receiver/reader and are stored in the database in which the vehicle data are also stored and/or in a further database, and wherein the vehicle data and participant data stored in the database or databases are assigned to one another with the aid of assignment means and wherein vehicle data and participant data are read out anew and the assignment of the vehicle data read out anew with the participant data read out anew is compared with the assignment previously allocated by the assignment means. As a result of the data to be stored being divided among a plurality of memory locations and the use of separate memory means at the vehicles and at the drivers or participants, the possibilities for manipulation are distinctly reduced, in particular also because the relevant data firstly concerning the vehicles and secondly concerning the participants are linked by a central computer and database assigned thereto at a location separate both from the vehicles and from the participants. For another thing, as a result the control of the assignment of driver and vehicles becomes variable and can likewise be predefined by the computer system only shortly before the beginning of the race, as a result of which manipulations to vehicles and the vehicle memories fixed thereto are made more difficult. In particular, the assignment generated by the assignment means can also be used to pre-define a starting grid. Reading out the vehicle data and participant data anew and checking the assignment of the data read out anew with the assignment allocated previously by the assignment means make it possible to ascertain whether the generated vehicle/driver assignment has actually been complied with.

In this case, the vehicle data stored in the vehicle memories and the participant data stored in the participant memories can be read out actively or passively, depending on what type of memory elements is used at the vehicles and the participants. By way of example, the memories provided at the vehicles and/or the participants can be provided with actively transmitting transmitter units, such that a passive receiver for reading out or receiving the data is sufficient in this case. Alternatively or additionally, only transmitter units that are passive and transmit on request can also be provided at the vehicles and/or the participants, such that in this case active readers are advantageously used for reading out the corresponding data, said readers actively interrogating the memory means at the vehicles and/or participants by means of corresponding signals.

In particular, RFID elements can respectively be used as vehicle memories and/or as participant memories, wherein said receivers/readers are advantageously designed as RFID readers in this case. The use of such RFID elements and corresponding RFID readers affords a variety of advantages; inter alia there is no need for a "line of sight" between transmitter and receiver, a high resolution is furthermore possible during position finding, that is to say that the data can be read out in a simple manner only when the RFID tag is situated at the correct position provided therefor, and it is furthermore possible to operate with low current consumption values.

As an alternative or in addition to such RFID elements or RFID readers, barcode elements can also be used as participant memories and/or vehicle memories, the barcode of said barcode elements comprising the respective information, in particular vehicle identifier and/or participant identifier. The readers used are then advantageously barcode readers which can be used to read the barcode elements.

In this case, the reading-out of the vehicle data stored in the vehicle memories and the reading-out of the participant data stored in the participant memories can be effected, in principle, by one and the same receiver/reader or else by a plurality of different receivers/readers. In a development of the invention, the first reading of the vehicle memories and/or of the participant memories can be effected by different receivers/readers in comparison with the renewed reading of the vehicle memories and/or participant memories, which is then preferably effected shortly before the beginning of racing or during the race or shortly after the race. By way of example, for the registration of the vehicles and/or of the participants the respective vehicle memory and/or the respective participant memory can be effected by a receiver/reader in the service and/or pit area, while a later reading for example during racing operation is then effected by receivers/readers which are provided directly at the racetrack or are assigned thereto. In this case, the participant data stored in the participant memories can be read out by respectively different receivers/readers in comparison with those used during the reading-out of the vehicle data stored in the vehicle memories; by way of example, the vehicle data can be read out from the vehicle memories by at least one receiver/reader assigned to the racetrack, while the participant data are read out from the participant memories by receivers/readers which are assigned to the control units for controlling the racing vehicles.

The abovementioned use of separate memory elements at the vehicles and the participants enables the assignment of drivers to vehicles to be predefined for a short time and changed in order to eliminate interest in manipulations on a specific vehicle. The computer system for monitoring and/or controlling racing operation, which has access to the at least one database in which the vehicle data and the participant data are stored at separate memory locations, assigns a specific vehicle to a specific driver and displays this on a display board or some other suitable display means only shortly before the start of the race. In particular, for this purpose the computer can have a random number generator or be connected to such a random number generator, such that the random number generator automatically performs the assignment of the vehicle data to the participant data, such that a specific vehicle is assigned to a specific participant in a randomly controlled manner.

In a development of the invention, a monitoring unit is provided, which monitors whether the assignment of driver and vehicle as predefined by the assignment means is actually complied with. Advantageously, each racing vehicle can be assigned a controller for controlling the vehicle, for example for steering and/or stepping on the gas or accelerating and/or braking, wherein each controller is provided with or connectable to a receiver/reader for reading out the participant data from the participant memories. For example by virtue of the participant memory being inserted or placed at the controller or being positioned in proximity thereto, said receiver/reader automatically reads out the participant data stored at the respective participant memory and transmits said data to an activation device. If the activation device ascertains that the "correct" participant data were read out and transmitted, i.e. the participant data corresponding to the assignment to the corresponding vehicle, then said activation device activates the controller and/or the respective racing vehicle. However, if participant data from an "incorrect" participant memory are transmitted to the activation device, the vehicle and/or the controller thereof are/is locked.

Here the activation device mentioned can be integrated into the controller mentioned, wherein in this case the control computer for racing operation transmits the corresponding assignment for the check of the read-out participant data to the controller. Alternatively or additionally, the activation device can also be integrated in the central control computer for racing operation, wherein in this case the participant data read out at the controller of the vehicle are advantageously transmitted to the central control computer in order there to perform the comparison with the computer-generated assignment. Said computer may or may not then transmit an activation signal to the controller, depending on the result of the comparison.

In an advantageous development of the invention, in addition or as an alternative to the abovementioned driver monitoring, a monitoring device is provided which monitors whether the respective racing vehicle is on the "correct" lane assigned to it by the computer. Advantageously, when a plurality of lanes are present, for this purpose each lane can be assigned a receiver/reader for reading out the vehicle data from a vehicle memory, wherein said receiver/reader is advantageously designed in such a way that the respective receiver/reader reads out only the vehicle data of that racing vehicle which is situated on the respective lane. Advantageously, corresponding RFID readers can be integrated into the lanes, for example can be arranged beneath the raceway surface and/or arranged in the region of the current collector slots.

Advantageously, an assignment of the vehicle data stored in the database to the lanes is likewise effected automatically by means of a random number generator, wherein the computer-aided assignment of the lanes to the vehicle data and/or to the participant data is displayed before the beginning of a race on the display means already mentioned previously.

Advantageously, the monitoring unit mentioned for complying with the lanes can comprise an activation device, which activates the respective racing vehicle and/or the respective lane only when the vehicle data read in by the reader situated at a lane corresponds to the assignment of the lanes to the racing vehicles as predefined by the computer. The activation device mentioned can in this case once again be integrated into the controller of the respective vehicle and/or be provided in the central computer for controlling racing operation and/or be switched into the energy supply of the respective lane in order to block the driving operation of the vehicle when the vehicle is on the incorrect lane.

In a development of the invention, the vehicle data read out from the vehicle memory of a racing vehicle and/or the participant data read out from the participant memory of a participant can also be used to set or alter operating parameters of the racetrack or to coordinate them with the respective vehicle and/or the respective participant. Advantageously, on the basis of the vehicle data read out, a track control device can set for example the energy supply of the racing vehicles on the racetrack in order to adapt the energy supply to the respective vehicle, whereby the use of different types of vehicles is made possible in a simple manner. Advantageously, a track control device can adapt the maximum current or voltage level to the vehicle used by virtue of the fact that the energy regulator that controls the energy supply of the racing vehicles on the racetrack is correspondingly leveled on the basis of the detected vehicle data. Alternatively or additionally, a vehicle parameter of a racing vehicle and/or a track parameter of the racetrack can also be set on the basis of the participant data read out from a participant memory, advantageously taking account of the assignment of said participant data to the read-out vehicle data as performed by the computer. Advantageously, by way of example, it is possible to predefine and/or vary a power limitation at the controller of a racing vehicle, for example in such a way that, with participation of a child who is still inept, a lower maximum speed is predefined in order to prevent the vehicles from going off at the bend. For this purpose, a corresponding power and/or regulator component in the controller of the vehicle can be correspondingly actuated and/or an energy regulator that controls the energy supply of the racing vehicles on the racetrack can be correspondingly set.

In a development of the invention, advantageously a monitoring of the racetrack by suitable monitoring means for example in the form of a camera is also controlled in a variable manner depending on the vehicle data read out from the vehicle memories and/or depending on the participant data read out from the participant memories and/or depending on the effected assignment of said vehicle and participant data, for example in such a way that the computer activates and/or deploys in each case that camera which has the leader of a race in the detection area. Alternatively or additionally, the changeover between different camera positions can be set depending on the vehicle data read out from the vehicle memories, wherein it is possible to set, in particular, a set-up of the switching means provided at the racetrack for changing over the camera positions depending on the vehicle data. If inductive switching means are provided, for example, which change over the camera position and/or activate a corresponding camera if a vehicle approaches, the design of the chassis has a considerable influence on the switching behavior of such inductive switching means. Advantageously, depending on the vehicle data read out, here the sensitivity of the switching means can be adapted to the respective racing vehicle.

In a development of the invention, on the basis of the vehicle data and participant data read out and their assignment predefined by the assignment means and/or the assignment checked by the renewed reading-out, the racing result or some other racing operation parameter can be set or racing evaluations can be performed, for example to the effect of who drove the fastest lap, who achieved the highest number of laps or who completed a predefined number of laps first. For this purpose, provision can be made, for example, for reading out the vehicle identifier from the vehicle memory at the start/finish line by means of the receivers/readers mentioned each time the respective racing vehicle crosses the finish line. Alternatively, the monitoring of the lap times, numbers of laps, vehicle speed and the like and the determination of the racing result can also be effected differently, however, without for this purpose the vehicle memories mentioned in each case being read in the manner mentioned. By way of example, the abovementioned cameras or further suitable monitoring means can be used to monitor racing operation or to determine the racing result.

It is furthermore proposed not to insert the sensor system with its individual components including the receivers/readers mentioned and further sensors from above into the raceway or to mount said sensor system fixedly on the substructure before the raceway is applied or to fix said sensor system directly to the raceway itself, but rather to premount the sensor system on a carrier and to introduce it from the side beneath the raceway into a receptacle space provided there. In particular, the at least one sensor unit is mounted on a guide element, which can be slid transversely with respect to the raceway from the lateral raceway edge into a receptacle space beneath the raceway. In this case, cables, leads or the like can be premounted in a finished manner with the at least one sensor unit and can be introduced together with the guide element from the side beneath the raceway, such that there is no need for separate cable laying or even cable connection only at the sensor position.

Advantageously, the sensor system beneath the raceway is not in contact with the latter or is spaced apart a little from the raceway, such that no vibrations from the raceway are introduced into the sensor system.

Premounting on a guide element is particularly advantageous when a plurality of sensor units are used for example for a plurality of lanes of the racetrack. In an advantageous development of the invention, a plurality of sensor units can be mounted at a predetermined distance from one another on the guide element, such that the respective sensor unit is located with accurate register beneath the intended raceway section when the guide element with all premounted sensor units is slid beneath the raceway. The predetermined mounting distance between the sensor units on the guide element can correspond, in particular, to a division of the raceway into lanes, such that beneath each lane there is located the sensor unit provided therefor. The spacing-apart of the premounted sensor units can also correspond to the spacing-apart of sensor windows which are introduced into the raceway and which can advantageously be provided alongside, in particular directly alongside, lane contacts, by means of which lane contacts the racing vehicles are supplied with energy. In this case, the sensor windows mentioned can be a delimited area in the raceway within which the raceway has an increased transmissivity for the sensor signals and/or variables to be detected. In particular, the sensor windows mentioned can form viewing windows if the sensor unit comprises optical detection means, as will be explained.

In order to be able to position the sensor units exactly and to find the predetermined sensor position easily, the guide element and/or the receptacle space mentioned beneath the raceway can be provided with sliding guide means which laterally guide and/or position the guide element relative to the raceway transversely with respect to the slide-in direction in which the guide element is slid beneath the raceway. In a development of the invention, the guide element can be designed in the form of a guide rail provided with at least one projecting guide strip and/or with at least one grooved guide cutout with which complementary guide means at the receptacle space can be brought into engagement. The receptacle space mentioned can advantageously be designed as a guide shaft whose walls at least in sections form guide surfaces at which the guide rail mentioned is guided beneath the raceway with an accurate fit.

The sensor unit mentioned can, in principle, be designed differently and have different detection means, depending on what tasks are intended to be fulfilled by the sensor system. In particular, one advantageous development of the invention can provide for the sensor units each to have optical detection means which look through viewing windows provided in the raceway in order to be able to detect vehicles on the raceway which drive over the viewing window in the raceway. Advantageously, the viewing window mentioned in the raceway is closed with a light-transmissive element, for example a glass component or some other, for example plastic-containing, transparent closure element that withstands the forces that usually act on the raceway. In principle, the viewing window mentioned could also be a non-closed or only partial, for example latticed, raceway cutout. Advantageously, however, the viewing window is completely closed with a light-transmissive element in order to protect the underlying sensor system against dust, dirt and the like.

The viewing window mentioned in the raceway and the sensor unit mentioned are coordinated with one another with regard to their position in such a way that the viewing window lies in the detection axis of the optical detection means.

In a development of the invention, the sensor unit has directional means which delimit the detection direction and orient it in a predetermined direction. In particular, the sensor unit can a signal input and/or output channel which determines the detection direction and which is preferably oriented perpendicularly to the raceway surface and/or approximately cylindrical and which allows signals that are to be detected by the sensor unit to advance to the detection means of the sensor unit only for a specific direction and/or allows scanning signals output by the sensor unit to emerge only in a predetermined direction. Like an auditory canal or a tube that predefines the viewing direction, the signal input and/or output channel mentioned can exactly orient the ingoing or outgoing sensor signals. Advantageously, the signal channel mentioned can consist of a tubular connector, at one end of which the detection means of the sensor unit are arranged and the other end of which is directed toward the sensor window mentioned in the raceway.

In a development of the invention, the optical detection means mentioned can be designed differently, depending on what detection task is to be fulfilled. By way of example, the optical detection means can operate in the manner of a light barrier in order to detect exactly the passage of a racing vehicle at the finishing line, for example. In principle, the optical sensor can be designed differently in this case. In the manner of an active light barrier sensor, provision can be made for the sensor unit to comprise a light source which projects light upward through the light window in the raceway, which, only when a vehicle drives over the viewing window, are reflected back from the vehicle, for example a mirror fitted thereto at the bottom of the vehicle, through the viewing window in the raceway and are detected by the optical detection means. Alternatively, such an optical sensor unit can also have only optical detection means. Given sufficient racetrack lighting, in particular from above for example by raceway lighting, the optical sensor beneath the viewing window in the raceway detects a constant amount of light as long as no vehicle drives over the viewing window. However, as soon as a vehicle drives over the viewing window, it becomes darker as it were beneath the viewing window, such that a signal decrease can be assessed as the passage of the racing vehicle.

Alternatively or additionally the sensor unit can comprise an optical barcode reader. It is thereby possible, in particular, not only to detect passage of a vehicle but also to identify the vehicle driving over the viewing window, if the barcode, preferably fitted to the bottom of the vehicle, contains a vehicle identifier. Depending on the information contained in the barcode fitted to the vehicle, different evaluations over and above purely the passage of the vehicle can be carried out.

Alternatively or additionally, the at least one sensor unit can also have a receiver/reader of a different type, in particular in the form of an RFID reader, for reading a vehicle memory fitted to the vehicle, as explained above.

According to one advantageous development of the invention, the sensor unit can have a plurality of detection means, preferably designed with different types, which interact with one another or are used in interplay with one another. In particular, a sensor unit can have optical detection means of the abovementioned type and also an RFID reader and/or a barcode reader in order to be able firstly to determine the passage of the vehicle exactly and secondly to identify the respective vehicle.

In a development of the invention in this case the plurality of detection means assigned to a lane are mounted jointly on the guide element mentioned, such that the plurality of detection means can be jointly positioned, mounted or demounted in a simple manner. As an alternative thereto, it would also be possible to provide a plurality of guide elements for the plurality of detection means, in order, during the maintenance of a detection means, to be able to remove only the latter in a targeted manner. However, preference is given to arranging all the detection means on a common guide element, since the positioning of the detection means relative to one another is thereby predefined precisely.

Advantageously, in this case it is possible to provide a control unit which predefines a temporal reception/reading window for the receiver/reader, to be precise depending on a signal of the further detection means. By way of example, the temporal detection or reading window for the RFID reader can be opened or predefined when the passage of a vehicle is reported from the optical sensor. This prevents, in a simple manner, the RFID reader from reading out, for example owing to an excessively large detection region, the data of a vehicle memory fitted to a vehicle travelling past on the neighboring lane.

The invention is explained in greater detail below on the basis of an exemplary preferred embodiment and associated drawings. In the drawings.

Figure 3:
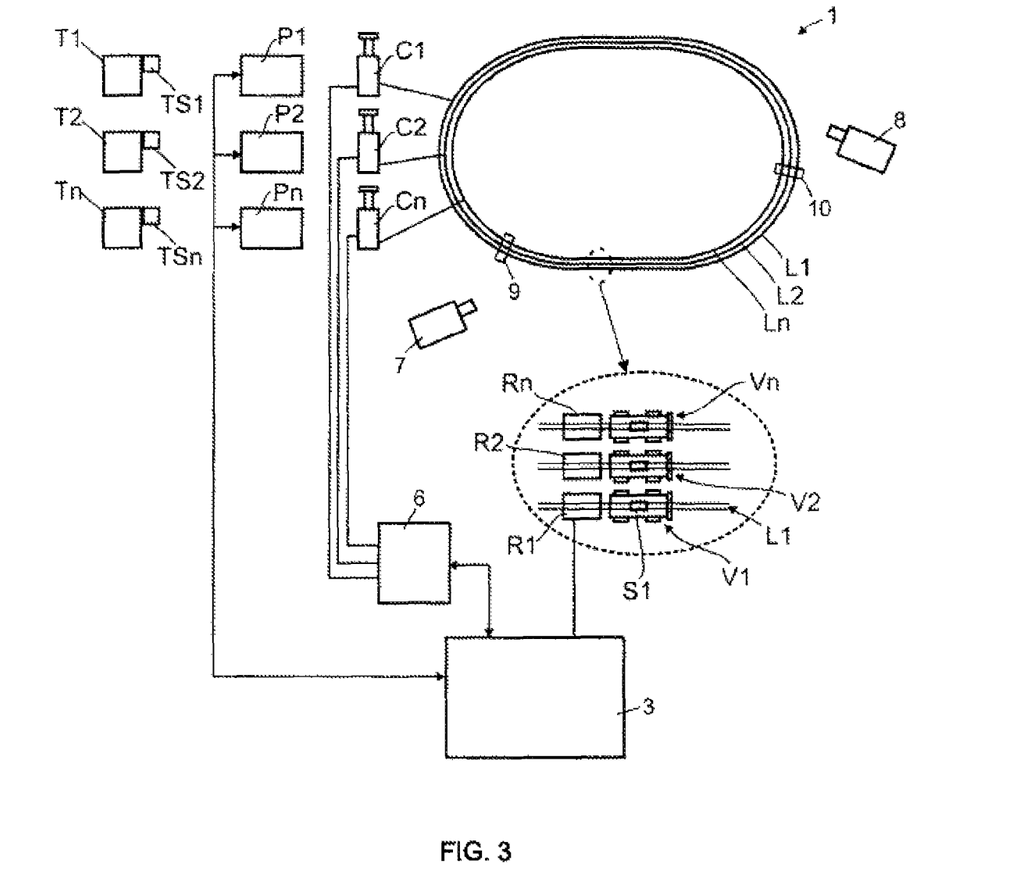
FIG. 3 shows a schematic illustration of a multi-lane racetrack, the monitoring thereof by a plurality of cameras and the linking of the control and/or monitoring device from FIG. 1, FIGS. 4a, 4b show a timing diagram with two time axes which shows the interplay of the control of racing operation with control of betting operation that regulates betting on a race.

The racetrack 1 shown in FIG. 3 comprises a plurality of lanes L1, L2, Ln and can advantageously be designed as a so-called slot car track, on which racing vehicles V1, V2, Vn with current collectors run in lanes, which lanes are incorporated into the raceway of the racetrack 1. In a manner known per se, current supply lines are incorporated (not illustrated in specific detail) into said lanes, the current and/or voltage application of which lines can be controlled by means of controller C1, C2, Cn connected thereto, wherein the current and/or voltage supply of each lane L1, L2, Ln can be controlled or regulated independently of the rest of the lanes.

As shown in FIG. 3, the racetrack 1 in the embodiment depicted is assigned two cameras 7 and 8, which monitor different sections of the racetrack 1 in order to be able to transmit a respective race in the form of television pictures.

Advantageously, with the aid of a central computer 3 it is possible to register more participants for the racetrack 1 than the racetrack 1 has lanes. By way of example, if a racetrack having six lanes is provided, eight different drivers can be registered, for example, wherein one lane-guided racing car can respectively be controlled per lane, such that a subset of the registered participants can compete in a race. In this case, the race can be carried out in various embodiments; by way of example, one aim may be to determine the fastest driver in each case, that is to say that driver who was the first to control a racing vehicle controlled by said driver along a defined track section of the car racing course. Alternatively or additionally, the number of laps achieved over a predetermined time can determine the result of the race. Depending on the racing event, in each case as a maximum only a specific number of the registered drivers may be authorized for driving on a respective lane, while the participants not selected for a racing event may have a pause or may acquire the opportunity for controlling the system or may be allocated to other tasks such as vehicle service and/or insertion of the racing vehicles into the racing lanes.

Figure 1:
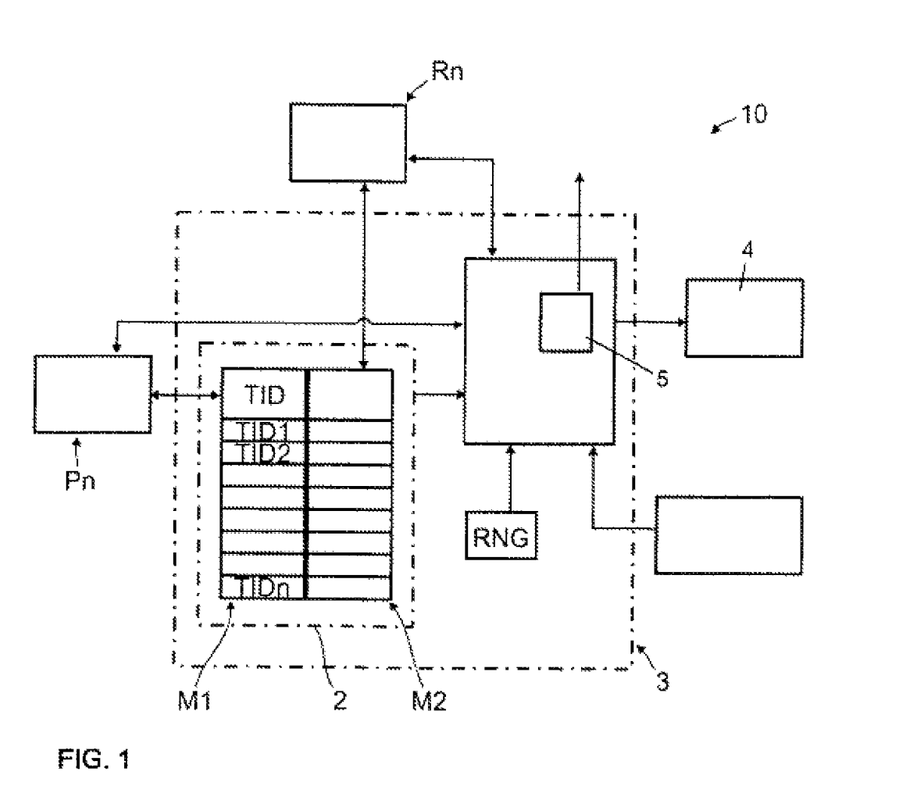
FIG. 1 shows a schematic illustration of the control and/or monitoring device for racing operation on a racetrack according to one advantageous embodiment of the invention, which shows the interaction of the central computer system with the vehicle memories and participant memories and the racing control.

Firstly, each of the participants T1, T2, Tn is initially assigned a participant memory TS1, TS2, TSn, preferably in the form of an RFID card with a respective driver identifier TID1, TID2, TIDn, wherein the respective participants are registered prior to racing operation by means of a suitable receiver and/or reader for example in the form of an RFID reader reading the respective participant memory TS1, TS2, TSn, wherein the respectively associated driver identifier TID is determined and the latter is stored in a first memory area M1 of a central database 2.

Furthermore, the racing vehicles V1, V2, Vn are provided with a respective vehicle memory S1, S2, Sn preferably in the form of an RFID element, to which a respective vehicle identifier is assigned. In a further step, the vehicle identifiers are likewise registered prior to racing operation by virtue of the vehicle memories S1, S2, Sn being read by means of a suitable receiver and/or reader, wherein the vehicle identifiers are determined and communicated to said database 2, where they are stored in a second memory area M2.

Preferably, two sets of racing vehicles can be registered in this case, wherein for each race only one of the racing vehicle sets is used, while the other vehicle set as replacement can be used for exchange after a specific number of races or a specific time, in order always to have available racing vehicles optimally suitable for driving and thus to be able to offer continuous racing sequences.

After the racing vehicles V1, V2, Vn and the participants T1, T2, Tn have been registered, the central computer 3 automatically performs the assignment of the participants to the racing vehicles before the beginning of a race and displays said assignment on a display 4. As shown in FIG. 1, for this purpose the computer 3 can have a random number generator RNG, which performs the assignment of the participants to the racing vehicles on a random basis.

Figure 2:
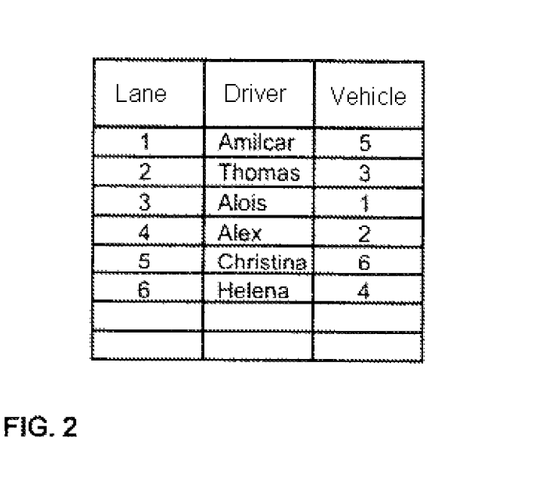
FIG. 2 shows a table filled in by way of example and showing the assignment—performed by the computer—of the racing participants to the racing vehicles and the assignment thereof to the different lanes of the racetrack.

Advantageously, the computer 3 also automatically performs an assignment of the racing vehicles to the respective lanes, wherein this assignment to the lanes can advantageously also be performed by the random number generator RNG on a random basis. This assignment is also displayed on the display 4 before the beginning of the race. Such a display 4 is shown by way of example in FIG. 2, which indicates the lanes V1, V2, Vn in the first column, the participants Amilcar, Thomas, Alois, Alex, Christina and Helena in the second column and the assigned racing vehicles V1, V2, Vn in the third column.

In accordance with the assignment and selection predefined on the display 4, the racing vehicles V1, V2, Vn are then to be placed onto the corresponding lanes L1, L2, Ln of the racetrack 1. The correct placement of the racing vehicles is monitored by means of the respective vehicle memories provided at the vehicles, wherein the respective lanes L1, L2, Ln are advantageously assigned receivers/readers R1, R2, Rn, for example the latter being incorporated therein or fitted thereto, in order to read the vehicle memory S1, S2, Sn of the vehicle situated on the respective lane. Said receivers/readers R1, R2, Rn check the vehicle identifier and forward the latter to an activation device 5, which can be arranged in the computer 3 or the controllers C1, C2, Cn mentioned. If the correct vehicle is situated on the correct lane, the corresponding lane and the corresponding vehicle are activated.

Furthermore, at the controllers C1, C2, Cn, by means of receivers/readers P1, P2, Pn provided there, the participant memories TS1, TS2, TSn of the participants handling the respective controller C1, C2, Cn are read. This can be done, for example, by the respective participant inserting the RFID card thereof into the corresponding controller P1, P2, Pn or bringing it into contactless communication therewith. The participant identifiers TID1, TID2, TIDn read out are then likewise sent to the activation device 5 mentioned in order to be compared there with the assignment predefined by the computer 3 in accordance with the display 4 according to FIG. 2. If the correct participant is at the correct controller, the respective controller is activated.

If all participants are at the predetermined controllers C1, C2, Cn and if all racing vehicles V1, V2, Vn are on the correct lanes, the computer 3 can generate a corresponding start signal, which is displayed in a suitable manner, for example likewise on the display 4.

On the basis of the vehicle identifiers read out from the vehicle memories S1, S2, Sn at the racetrack 1 and the corresponding assignment to the lanes L1, L2, Ln, a track control device 6, which can be part of the computer 3, can optimally coordinate corresponding track parameters with the respective racing vehicles V1, V2, Vn. Such system coordination can comprise, for example, an optimum voltage supply of the respective lane L1, L2, Ln for the respective racing vehicle V1, V2, Vn, whereby more flexible handling becomes possible by virtue of the use of many different drive motors for the racing cars.

Furthermore, the changeover of the cameras 7, 8 mentioned can likewise be controlled depending on the vehicle identifiers read out. If inductive switching means 9, 10 are provided at the racetrack 1, for example, which means are activated by a respective racing vehicle V1, V2, Vn driving past and activate the corresponding camera 7, 8 or release the image provided thereby for transmission, the response threshold of the switching means 9, 10 mentioned can be set by the computer 3 depending on the vehicle identifiers read out.

Advantageously, before each race and/or after a predetermined number of races have been undertaken, a further determination of the driver/racing vehicle/lane position can take place, wherein it is also possible to choose from all registered participants. This is advantageously performed automatically by the computer 3. Said further determination of the participants, the racing vehicles and the lanes and the assignment thereof to one another increases security against manipulations or arrangements.

Figure 4A:
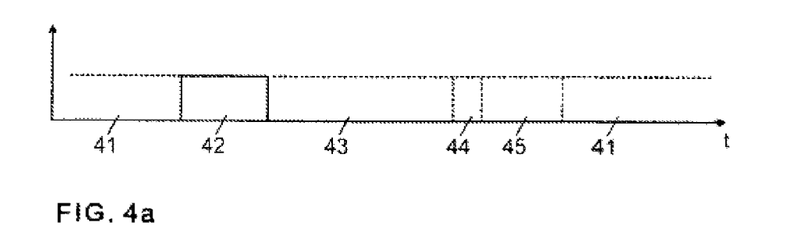
Figure 4B:
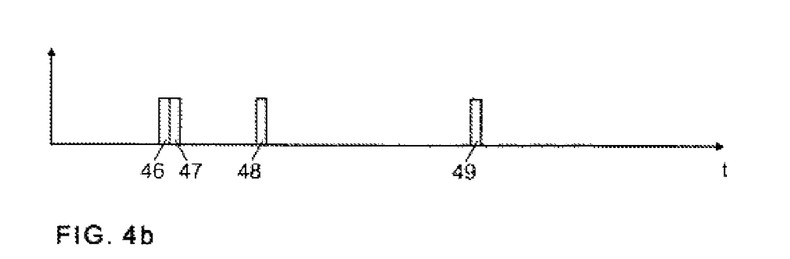

As shown in FIGS. 4a and 4b, the control and monitoring system for racing operation can also be used to actuate a transmission and/or betting operation control device (not illustrated in more specific detail) which controls the placing of bets on a racing event and displays the winnings achieved. As shown by a comparison of the two time axes in FIG. 4, firstly as shown in FIG. 4a in a waiting phase 41 before a race with the aid of the computer 3 on the basis of a race setup event 46, the abovementioned selection and assignment of the participants, the racing vehicles and the lanes are performed and displayed as "race setup" on the display 4, wherein on the basis of a quote calculation event 47 a determination and display of the betting rates can also be performed. Said betting operation control device then opens a betting time window 42 for accepting bets at a betting terminal, for example, which window is closed again shortly or directly before the beginning of the corresponding race. If said betting time window has been closed automatically by the device, the start signal 48 for the race is given and, by means of the cameras 7 and 8, the racing event is transmitted during a live event time window 43 via a satellite link, for example, and displayed on the betting terminal. After the end of the race, for example the outcome of the race, that is to say in particular the finish, can be transmitted again in slow motion during a finish time window 44. On the basis of a confirmation event 49, the betting operation control device mentioned subsequently announces the result and displays the winnings as win animation 45.

Figure 5:
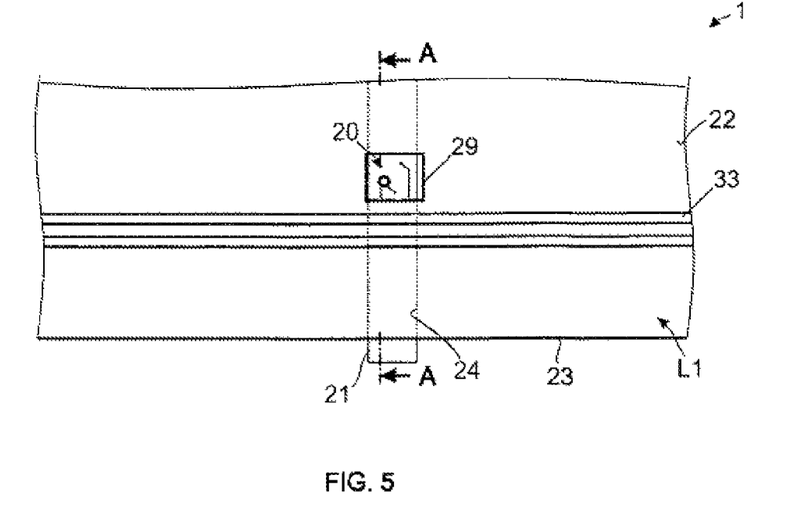
FIG. 5 shows a schematic plan view of a lane of a racetrack, which shows the sensor window arranged alongside the lane contacts of the raceway and the recessed sensor unit arranged underneath.

The exit from a racetrack 1 as illustrated in FIG. 5 shows the raceway 22 of a lane L1 of a slot car track, in which the lane contacts 33 known per se are incorporated in order to supply racing vehicles driving thereon with current. Although only one lane L1 is illustrated, it goes without saying that the racetrack 1 can have a plurality of lanes arranged alongside one another.

As shown in FIG. 5, in the substructure beneath the raceway 22, a receptacle space 24 extending transversely with respect to said raceway 22 in the form of a receptacle shaft is provided, into which can be slid the sensor system for monitoring the racing vehicles driving on the raceway 22.

Figure 6:
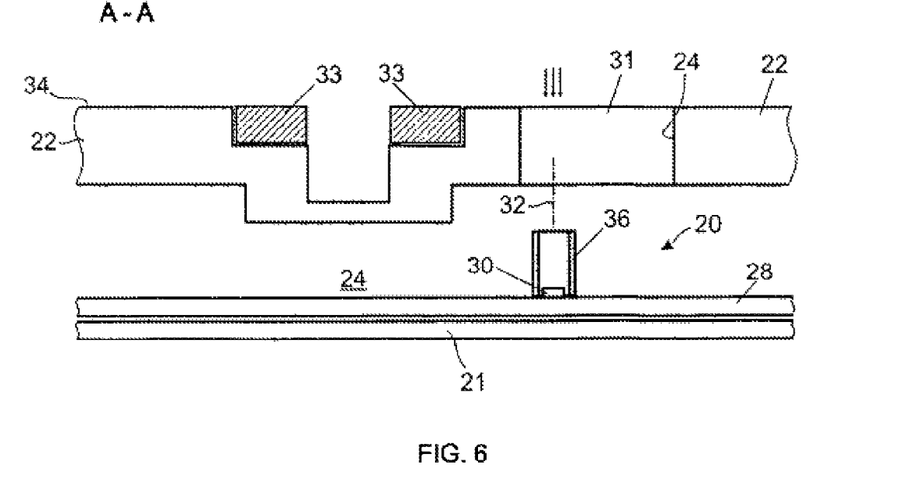
FIG. 6 shows a sectional view through the raceway of the racetrack and the underlying sensor unit along the line A-A in FIG. 5, wherein, in the raceway, the sensor window alongside the lane contacts is shown and, in respect of the sensor unit situated beneath the raceway, the guide rail, the printed circuit board mounted thereon and the sensor unit in turn mounted thereon are shown.
Figure 7:
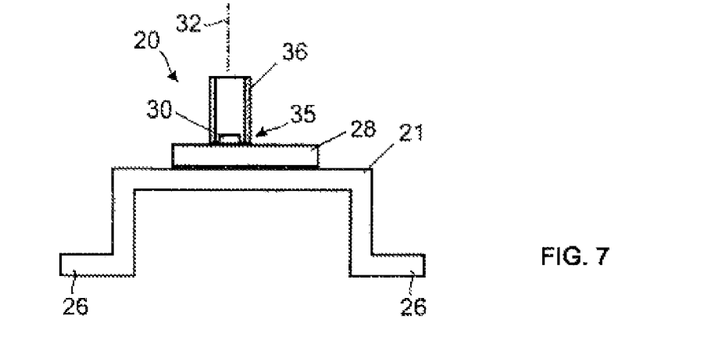
FIG. 7 shows a cross section through the guide rail and the sensor unit fixed thereon from FIG. 6.
Figure 8:
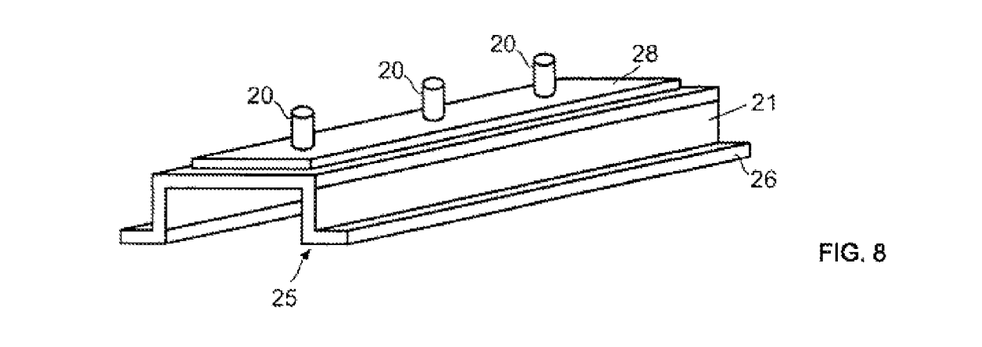
FIG. 8 shows a schematic, perspective view of the guide rail with the printed circuit board mounted thereon and the sensor units fixed thereto for monitoring a plurality of lanes of a multi-lane racetrack.

As shown in the further FIGS. 6-8, an elongate guide element 21 is provided as carrier for the sensor system, said guide element being designed as a guide rail in the form of a strand profile in the embodiment depicted. Said guide rail has a stepped or pedestal-shaped cross section in the embodiment depicted and comprises laterally projecting guide strips 26 serving as sliding guide means 25 in order to position the guide rail exactly when the guide element 21 is slid into the receptacle space 24. Said receptacle space 24 is matched to the profile of the guide element 21 in cross section or provided with matched sliding guide means, such that interacting guide surfaces or elements come into engagement and exactly position the guide rail transversely with respect to its longitudinal direction.

In the present exemplary embodiment, a printed circuit board 28 is fixed on said guide element 21, said printed circuit board bearing by its rear side on the top side of the rail profile mentioned, cf. FIGS. 7 and 8.

Figure 9:
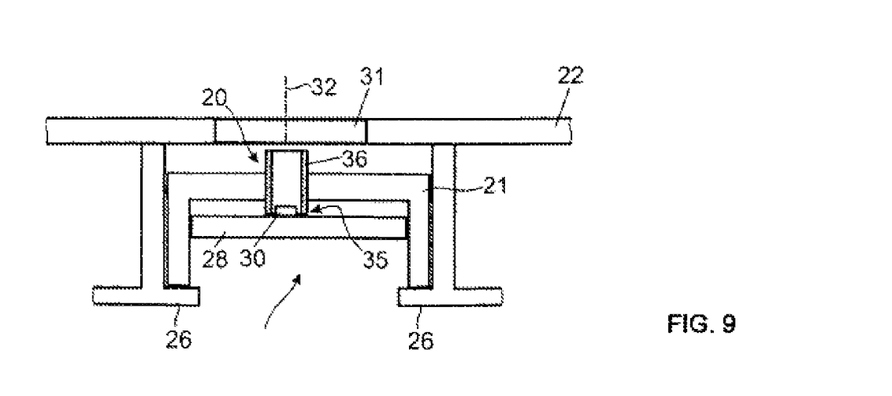
FIG. 9 shows a cross section similar to FIG. 2 through the guide rail according to a further advantageous embodiment of the invention, in which the sensor unit is mounted with the associated printed circuit board on the underside of the guide rail.

As an alternative to the embodiment according to FIGS. 7 and 8, in an advantageous development of the invention, the printed circuit board 28 with the sensor system fixed thereto can also be mounted from below on said rail profile, such that the electronics are better protected. As shown in FIG. 9, in particular said printed circuit board can be received between the limbs of the U-shaped rail profile, such that the printed circuit board 28 with its top side looks as it were at the underside of the central section of the guide rail.

Said printed circuit board 28 in turn carries a plurality of sensor units 20 arranged in a manner spaced apart from one another in the longitudinal direction of the rail. In this case, the spacing-apart of the sensor units 20 from one another advantageously corresponds to the spacing-apart of the lanes or the spacing-apart of the lane contacts 33 of different lanes of the racetrack 1, such that the sensor units 20 can be positioned with register accuracy alongside said lane contacts 33 beneath the raceway 22, as is shown in FIG. 6.

In this case, the printed circuit board 28 can be designed in an integral fashion throughout or else in a multipartite fashion.

In the embodiment depicted, the sensor units 20 each comprise optical detection means 30 in the form of a photosensor, which is applied directly on said printed circuit board 28 and is connected to the conductor tracks thereof.

Said photosensor can be designed as a photoresistor or as a photodiode or as a phototransistor, which operates in a manner making use of the internal photoelectric effect, or as a photocell or photomultiplier or as a pyroelectric sensor, which operates in a manner making use of charge transfers on account of the temperature change upon light absorption.

As shown in FIG. 6 and FIG. 7, in this case a light channel 36 is set over said photosensor, which light channel as it were delimits and predefines the field of view of the photosensor and determines the detection axis 32 of the photosensor. Said light channel 36 extends perpendicularly to the plane of the printed circuit board 28 and in the mounted state perpendicularly to the raceway surface 34. In the embodiment according to FIG. 9, said light channel 36 is led through a corresponding cutout in the guide element 21, since there, as explained, the printed circuit board 28 is mounted on the underside of the rail profile. In particular, said cutout in the guide element 21 can be adapted with an accurate fit to the outer contour of the light channel 36, as a result of which said light channel 36 is guided or held on the guide element 21, thus improving the fixing of the sensor system to the guide element 21. If appropriate, here it is also possible to provide a force-locking or cohesive connection for example by adhesive bonding in order to further improve the fixing of the light channel 36. A light channel 36 fixed to the guide element 21 in this way simultaneously serves as protection for the photosensor.

Alongside the lane contacts 33, sensor windows 29 are introduced into the raceway 22, said sensor windows being closed by light-transmissive elements 31, cf. FIG. 6. Said sensor units 20 are arranged beneath the raceway 22 such that the detection axis 32 of the sensor units 20 passes through said sensor windows 29.

The premounted unit comprising the common guide element 21 and the sensor units 20 mounted thereon can be slid from the raceway edge 23 transversely with respect to the raceway 22 beneath the latter, wherein the sensor units 20 become situated with register accuracy beneath the raceway 22 in the region of the sensor windows 29, as is shown in FIG. 6.

The barcode reader 35 can be designed as a CCD scanner which can detect a flat line exit of the barcode in the entire width thereof all at once. For this purpose, the code is illuminated by light-emitting diodes. The barcode reflects onto a CCD or photodiode linear array depending on brightness or darkness. A decoder deciphers from this the lines and gaps of the barcode and thus the information contained therein.

The barcode reader 35 can be designed as a laser scanner, wherein one or more laser beams can be directed onto the barcode and guided over the barcode linearly at high speed by means of an oscillating mirror, a mirror wheel or other optical systems. The light reflected more strongly or more weakly from the barcode by the light and dark lines is then detected by an optical unit and converted into electrical signals by means of a photodiode and evaluated.

Alternatively or additionally, so-called RFID readers or barcode readers can also preferably be mounted on the printed circuit board 28 in order to be able to read an RFID chip or barcode fixed to the vehicles when the vehicles drive over the sensor window 29.

Advantageously, in this case the read-out process can be initiated when the optical detection means 30 detect a vehicle driving over. Alternatively or additionally, even further sensors such as inductive sensors, for example, can also be fitted on said printed circuit board 28 in order to be able to detect vehicles approaching or moving away. Such further sensors can be positioned, in particular, as viewed in the direction of travel, in front of and/or behind said optical detection means 30.

The invention claimed is:

1. A method for controlling and/or monitoring a plurality of racing vehicles controlled by racing participants on a racetrack, wherein each racing vehicle is respectively provided with a vehicle memory, in which vehicle data are stored, which vehicle data are read out by a receiver/reader and stored in at least one database, wherein each racing participant is provided with a participant memory, which is separate from the vehicle memory and in which participant data are stored, and the participant data are read out by said receiver/reader and are stored in the at least one database, and wherein the vehicle data and participant data stored in the at least one database are assigned to one another with the aid of assignment means, and wherein a check of the assignment of the vehicle data and of the participant data to one another is performed by a monitoring means, during which each racing vehicle is assigned a controller for controlling the vehicle and each controller is in communication with a receiver/reader for reading out the participant data from the participant memory, wherein the respective receiver/reader reads out the participant data only of the participant memory of the participant situated at the controller and an activation device activates the controller and/or the respective racing vehicle only when the participant data read in at the respective controller corresponds to the assignment of the vehicle data and the participant data determined by the assignment means, and wherein an activation signal may or may not then be transmitted to the controller, depending on the result of the comparison.

2. The method as claimed in claim 1, wherein, when a plurality of lanes are present, each lane is provided with a receiver/reader for reading in the vehicle data from the vehicle memory, wherein the respective receiver/reader reads out the vehicle data only of the racing vehicle situated on the respective lane.

3. The method as claimed in claim 2, wherein one assignment of the vehicle data stored in the at least one database to the lanes is performed automatically by means of a random number generator and the assignment of the lanes to the vehicle data and/or to the participant data is displayed on a display before the beginning of a race.

4. The method as claimed in claim 3, wherein the activation device activates the respective racing vehicle and/or the respective lane only when the vehicle data read in by the reader situated at a lane corresponds to the assignment of the lanes to the racing vehicles predetermined by the assignment means.

5. The method as claimed in claim 1, wherein detection means at the racetrack for detecting and/or monitoring the racing vehicles depending on the vehicle data read out from the vehicle memories are configured automatically, in particular set in terms of their response behavior and coordinated with the respective racing vehicles.

6. The method as claimed in claim 1, wherein RFID elements are respectively used as vehicle memories and/or as participant memories and an RFID reader is used as receiver/reader.

7. The method as claimed in claim 1, wherein barcode elements are respectively used as vehicle memories and/or as participant memories and a barcode reader is used as receiver/reader.

8. The method as claimed in claim 1, wherein a racing start signal for indicating the beginning of racing is generated automatically by a start device wherein, on the basis of a comparison of the vehicle data read out from the vehicle memory and the participant data read out from the participant memory with the assignment generated by a computer of the vehicle data to the participant data and/or the assignment of the vehicle data to lanes of the racetrack, it has been ascertained that the actual positioning of the participant memory at the controllers of the racing vehicles and/or the actual disposition of the racing vehicles on the lanes corresponds to the respective computer-generated assignment.

9. The method as claimed in claim 1, wherein the assignment of the vehicle data and participant data to one another is performed automatically by means of a random number generator.

10. The method as claimed in claim 1, wherein the vehicle data and participant data assigned to one another are displayed on a display before the beginning of a race.

11. A method for controlling and/or monitoring a plurality of racing vehicles controlled by racing participants on a racetrack, wherein each racing vehicle is respectively provided with a vehicle memory, in which vehicle data are stored, which vehicle data are read out by at least one receiver/reader and stored in at least one database, wherein each racing participant is provided with a participant memory, which is separate from the vehicle memory and in which participant data are stored, and the participant data are read out by the at least one receiver/reader and are stored in the at least one database, and wherein the vehicle data and participant data stored in the database are assigned to one another with the aid of assignment means, and wherein a check of the assignment of the wherein a track control device sets at least one operating parameter of the racetrack on the basis of the vehicle data read out from the vehicle memory of a racing vehicle, wherein an energy regulator that controls the energy supply of the racing vehicles on the racetrack is preferably set on the basis of the detected vehicle data, wherein during the check of the assignment of the vehicle data and of the participant data to one another, each racing vehicle is assigned a controller for controlling the vehicle and each controller is in communication with a receiver/reader for reading out the participant data from the participant memory, wherein the respective receiver/reader reads out the participant data only of the participant memory of the participant situated at the controller and an activation device activates the controller and/or the respective racing vehicle only when the participant data read in at the respective controller corresponds to the assignment of the vehicle data and the participant data determined by the assignment means, and wherein an activation signal may or may not then be transmitted to the controller, depending on the result of the comparison.

12. A method for controlling and/or monitoring a plurality of racing vehicles controlled by racing participants on a racetrack, wherein each racing vehicle is respectively provided with a vehicle memory, in which vehicle data are stored, which vehicle data are read out by at least one receiver/reader and stored in at least one database, wherein each racing participant is provided with a participant memory, which is separate from the vehicle memory and in which participant data are stored, and the participant data are read out by the at least one receiver/reader and are stored in the at least one database, and wherein the vehicle data and participant data stored in the database are assigned to one another with the aid of assignment means, and wherein a check of the assignment of the vehicle data and of the participant data to one another is performed by a monitoring means, wherein at least one vehicle parameter of a racing vehicle and/or a track parameter of the racetrack is set on the basis of the participant data read out from a participant memory and the assignment of said participant data to the vehicle data read out from the vehicle memory, said assignment being performed by the assignment means, wherein an energy regulator that controls the energy supply of the racing vehicles on the racetrack is set on the basis of said participant data and the assignment thereof and/or a power regulator that controls the power output of the racing vehicle is set on the basis of the participant data read out and the assignment thereof, wherein during the check of the assignment of the vehicle data and of the participant data to one another, each racing vehicle is assigned a controller for controlling the vehicle and each controller is in communication with a receiver/reader for reading out the participant data from the participant memory, wherein the respective receiver/reader reads out the participant data only of the participant memory of the participant situated at the controller and an activation device activates the controller and/or the respective racing vehicle only when the participant data read in at the respective controller corresponds to the assignment of the vehicle data and the participant data determined by the assignment means, and wherein an activation signal may or may not then be transmitted to the controller, depending on the result of the comparison.

13. A method for controlling and/or monitoring a plurality of racing vehicles controlled by racing participants on a racetrack, wherein each racing vehicle is respectively provided with a vehicle memory, in which vehicle data are stored, which vehicle data are read out by at least one receiver/reader and stored in at least one database, wherein each racing participant is provided with a participant memory, which is separate from the vehicle memory and in which participant data are stored, and the participant data are read out by the at least one receiver/reader and are stored in the at least one database, and wherein the vehicle data and participant data stored in the at least one database are assigned to one another with the aid of assignment means, and wherein a check of the assignment of the vehicle data and of the participant data to one another is performed by a monitoring means, wherein monitoring of the racetrack is controlled by at least one camera depending on the vehicle data read out from the vehicle memories and/or depending on the effected assignment of said vehicle data to the participant data read out from the participant memories, wherein during the check of the assignment of the vehicle data and of the participant data to one another, each racing vehicle is assigned a controller for controlling the vehicle and each controller is in communication with a receiver/reader for reading out the participant data from the participant memory, wherein the respective receiver/reader reads out the participant data only of the participant memory of the participant situated at the controller and an activation device activates the controller and/or the respective racing vehicle only when the participant data read in at the respective controller corresponds to the assignment of the vehicle data and the participant data determined by the assignment means, and wherein an activation signal may or may not then be transmitted to the controller, depending on the result of the comparison.

14. The method as claimed in claim 13, wherein the racetrack is monitored by a plurality of cameras, wherein a changeover, in particular the changeover times, between the different cameras is controlled depending on the vehicle data read out from the vehicle memories.

15. A device for controlling and/or monitoring a plurality of racing vehicles controlled by racing participants on a racetrack, the device comprising:
   vehicle memory assigned to each of the racing vehicles and configured to store vehicle data therein;
   participant memory configured to store participant data therein, wherein the vehicle memory and the participant memory are separate memory elements;
   at least one reader assigned to the racetrack and serving for reading out the vehicle data and the participant data;
   at least one database for storing the vehicle data and the participant data read out by the reader;
   assignment means for assigning the vehicle data and participant data stored in the database; and
   monitoring means for monitoring the assigned vehicle data and participant data and designed such that, during monitoring, each racing vehicle is assigned a controller for controlling the vehicle and each controller is in communication with a receiver/reader for reading out the participant data from the participant memory, wherein the respective receiver/reader reads out the participant data only of the participant memory of the participant situated at the controller and an activation device activates the controller and/or the respective racing vehicle only when the participant data read in at the respective controller corresponds to the assignment of the vehicle data and the participant data determined by the assignment means, and wherein an activation signal may or may not then be transmitted to the controller, depending on the result of the comparison.

16. The device as claimed in claim 15, wherein at least one sensor unit is arranged beneath the raceway surface of the racetrack, said at least one sensor unit being mounted on a guide element, which can be slid transversely with respect to the raceway from the lateral raceway edge into a receptacle space beneath the raceway, wherein one of the guide element and the receptacle space have a sliding guide means for lateral guidance and positioning transversely with respect to the slide-in direction of the guide element into the receptacle space.

17. The device as claimed in claim 16, wherein a plurality of sensor units are mounted at a predetermined distance from one another on the guide element, wherein said distance between the sensor units corresponds to the division of the raceway into lanes and/or the distance between sensor windows provided in the raceway, wherein the plurality of sensor units is preferably mounted on a common printed circuit board, which forms at least one part of the guide element and/or is rigidly fixed to the guide element.

* * * * *

UNITED STATES PATENT AND TRADEMARK OFFICE
CERTIFICATE OF CORRECTION

PATENT NO.        : 9,283,472 B2                        Page 1 of 1
APPLICATION NO.   : 13/816398
DATED             : March 15, 2016
INVENTOR(S)       : Peter Platzer et al.

It is certified that error appears in the above-identified patent and that said Letters Patent is hereby corrected as shown below:

Claims

Column 15, Lines 20-21, Claim 11:

After "a check of the assignment of the"
Insert --vehicle data and of the participant data to one another is performed
by a monitoring means--.

Signed and Sealed this
Twenty-eighth Day of June, 2016

Michelle K. Lee
*Director of the United States Patent and Trademark Office*